(12) United States Patent
Lee et al.

(10) Patent No.: US 10,121,087 B2
(45) Date of Patent: Nov. 6, 2018

(54) SYSTEM AND METHOD FOR RECOGNIZING CREDIT CARD NUMBER AND EXPIRATION DATE USING TERMINAL DEVICE

(71) Applicant: SK PLANET CO., LTD., Seongnam-si, Gyeonggi-do (KR)

(72) Inventors: Jimin Lee, Seongnam-si (KR); Han Saem Kim, Anyang-si (KR); Chan Kyu Choi, Seongnam-si (KR)

(73) Assignee: SK PLANET CO., LTD., Seongnam-si (KR)

( * ) Notice: Subject to any disclaimer, the term of this patent is extended or adjusted under 35 U.S.C. 154(b) by 225 days.

(21) Appl. No.: 15/209,773

(22) Filed: Jul. 14, 2016

(65) Prior Publication Data

US 2017/0068867 A1    Mar. 9, 2017

(30) Foreign Application Priority Data

Sep. 8, 2015   (KR) ........................ 10-2015-0127147

(51) Int. Cl.
| | |
|---|---|
| *G06K 9/32* | (2006.01) |
| *G06K 9/00* | (2006.01) |
| *G06K 9/46* | (2006.01) |
| *G06K 9/62* | (2006.01) |

(52) U.S. Cl.
CPC ......... *G06K 9/325* (2013.01); *G06K 9/00449* (2013.01); *G06K 9/4604* (2013.01); *G06K 9/4628* (2013.01); *G06K 9/4652* (2013.01); *G06K 9/6272* (2013.01)

(58) Field of Classification Search
None
See application file for complete search history.

(56) References Cited

U.S. PATENT DOCUMENTS

| | | | | |
|---|---|---|---|---|
| 2015/0347859 A1* | 12/2015 | Dixon | .................... | G06K 9/186 |
| | | | | 382/138 |
| 2015/0347860 A1* | 12/2015 | Meier | ...................... | G06K 9/72 |
| | | | | 382/140 |
| 2015/0347861 A1* | 12/2015 | Doepke | .............. | H04N 5/23245 |
| | | | | 382/199 |

* cited by examiner

*Primary Examiner* — Bernard Krasnic
(74) *Attorney, Agent, or Firm* — Brinks Gilson & Lione

(57) ABSTRACT

Disclosed herein is a system and method for recognizing the credit card number and expiration date of a credit card using a terminal device. More specifically, the method may include the steps of (a) obtaining an image of the card through a camera, (b) performing position detection and number recognition on card numbers within the image obtained at the step (a), and (c) performs position detection and number recognition on expiration date numbers within the image obtained at the step (a). In accordance with an embodiment of the present invention, a recognition rate can be improved compared to an image processing-based technology.

8 Claims, 15 Drawing Sheets

FIG. 15
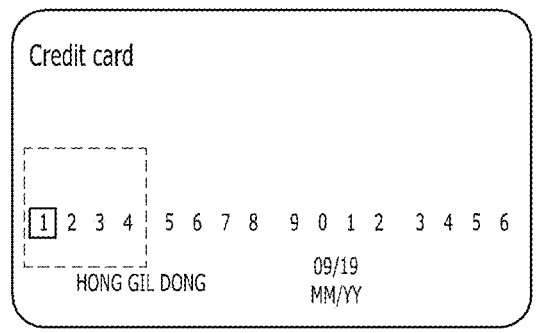
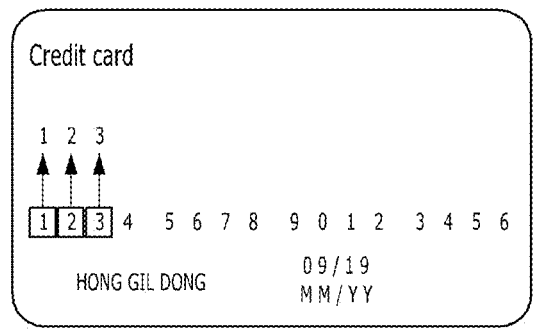
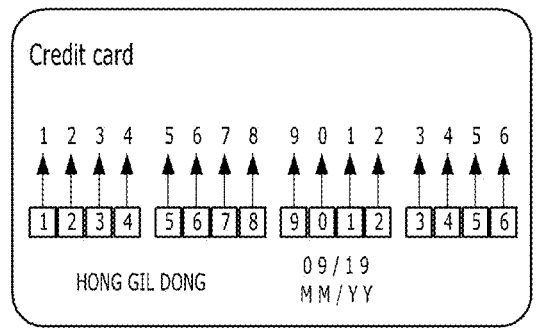
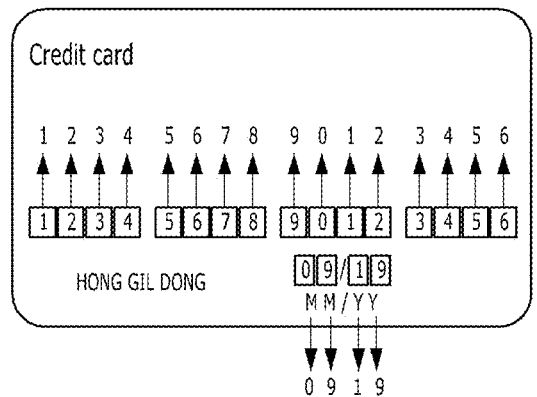

SYSTEM AND METHOD FOR RECOGNIZING CREDIT CARD NUMBER AND EXPIRATION DATE USING TERMINAL DEVICE

CROSS REFERENCE TO RELATED APPLICATION

The present application claims the benefit of Korean Patent Application No. 10-2015-0127147 filed in the Korean Intellectual Property Office on Sep. 8, 2015, the entire contents of which are incorporated herein by reference.

BACKGROUND OF THE INVENTION

1. Technical Field

The present invention relates to a system and method for recognizing the credit card number and expiration date of a credit card using a terminal device and, more particularly, to a system and method for recognizing the credit card number and expiration date of a credit card using a convolutional neural network that is a kind of deep learning.

2. Description of the Related Art

A business operator, such as a credit card company or a payment company, needs to secure and maintain information about the credit card of a customer on business. A credit card company may input and manage information about an issued card before it distributes the card to a customer after issuing the card.

Furthermore, business operators in various fields may collect credit card information from customers and manage the credit card information, if necessary. For example, a specific business operator may collect card information about a customer with the consent of the customer, may store the collected card information, and may periodically demand payment of a customer using the stored card information.

If a business operator manages card information about many customers, however, manually inputting card information about customers is very cumbersome, consumes a lot of time, and has a good possibility that an erroneous card number may be inputted due to the mistake of the person in charge.

Furthermore, with the recent development of Internet commercial transaction and mobile commercial transaction, persons may directly input credit card payment information through an application of a smart phone. In this case, there is a disadvantage in that a lot of time is taken compared to recognition using a camera.

In order to solve such a problem, many image processing-based recognition systems for recognizing numbers printed on a credit card have recently been developed.

Various types of information, such as a card number, an expiration date, and a name, are printed on a credit card. The card number format of a credit card and the layout of card information are slightly different for each card company. Accordingly, it is practically very difficult to improve a recognition rate using only image processing.

Furthermore, it is difficult to technologically implement such an image processing technology. If a background image of a credit card is complicated or the coating of embossed numbers is peeled off, there is a problem in that an erroneous card number may be inputted due to an error because a recognition rate is reduced.

SUMMARY OF THE INVENTION

Accordingly, the present invention has been made keeping in mind the above problems occurring in the prior art, and an object of the present invention is to improve a recognition rate for credit card numbers and expiration date numbers.

Another object of the present invention is to reduce a capacity occupied by a convolutional neural network of a recognition system because a capacity and performance are restricted when the recognition system is driven in a mobile device.

Yet another object of the present invention is to avoid a speed issue which may occur in a UX/UI manner because a mobile device has limited hardware performance.

In accordance with an aspect of the present invention, a method for recognizing, by a terminal device, the card number and expiration date of a card includes the steps of (a) obtaining an image of the card through a camera, (b) performing position detection and number recognition on card numbers within the image obtained at the step (a), and (c) performs position detection and number recognition on expiration date numbers within the image obtained at the step (a).

In this case, the terminal device may use a convolutional neural network when recognizing the card numbers and the expiration date numbers.

The method may further include the step of (d) performing position detection and number recognition on the expiration date numbers again using the image of the card, the positions of the expiration date numbers, and the format of the expiration date numbers obtained at the steps (a) to (c) in an activity step if the recognition of the expiration date numbers at the step (c) fails, after the step (c).

In this case, the step (d) may include changing a region of interest (ROI) for detecting the position of the first number of the expiration date numbers to a predetermined position and detecting the positions of the expiration date numbers again.

Furthermore, the step (d) may include recognizing the card numbers while performing position detection and number recognition on the expiration date numbers again.

The step (a) may include the step of obtaining, by the camera of the terminal device, an image frame of the card, the step of displaying a guide line on the display means of the terminal device, and a preview step of obtaining an image frame of the card which overlaps the displayed guide line.

The step (b) includes (1) detecting the position of the first number of the card numbers, (2) detecting the positions of first three card numbers of the card numbers, (3) determining whether the image patch of the first three card numbers recognized at the step (2) corresponds to numbers, (4) comparing a recognition probability value with a predetermined threshold if, as a result of the determination at the step (3), it is determined that the image patch of the first three card numbers correspond to numbers, and recognizing the first three card numbers, (5) extracting information about a card type, a card number format, the positions of the expiration date numbers, and the format of the expiration date numbers from the first three card numbers recognized at the step (4), and (6) performing position detection and number recognition on remaining card numbers other than the first three card numbers using the information extracted at the step (5).

In this case, the step (6) includes the steps of detecting the positions of the remaining card numbers using the information about the card type and card number format extracted at the step (5), determining whether the image patch of the remaining card numbers recognized at the step of detecting the remaining card numbers corresponds to numbers, comparing a recognition probability value with a predetermined threshold if, as a result of the determination, it is determined that the image patch of the remaining card numbers corresponds to numbers and recognizing the remaining card numbers other than the first three card numbers, determining the validity of all of the recognized first three card numbers and remaining card numbers using an Luhn algorithm, and extracting the results of the recognition of the card numbers and information about positions of the respective numbers.

The step (c) includes the steps of detecting the position of the first number of the expiration date numbers using the information about the positions of the expiration date numbers and the format of the expiration date numbers extracted at the step (5), determining whether the first number of the expiration date numbers is 1 or 0 by recognizing the first number, and performing position detection and number recognition on the remaining expiration date numbers other than the first number of the expiration date numbers.

In this case, the step of performing position detection and number recognition on the remaining expiration date numbers other than the first number of the expiration date numbers includes the steps of detecting the positions of the remaining expiration date numbers using the position of the first number of the expiration date numbers detected at the step of detecting the position of the first number of the expiration date numbers, determining whether the image patch of the remaining expiration date numbers recognized at the step of detecting the remaining expiration date numbers corresponds to numbers, comparing a recognition probability value with a predetermined threshold if, as a result of the determination, it is determined that the image patch of the remaining expiration date numbers corresponds to numbers and recognizing the remaining expiration date numbers other than the first number of the expiration date numbers, and determining whether a combination of the recognized first number and remaining expiration date numbers corresponds to valid expiration date numbers.

In accordance with another aspect of the present invention, a method for reducing the capacity of a convolutional neural network which is used for a terminal device to recognize the card number and expiration date of a card includes the steps of (a) dividing a weight value of each of layers of the convolutional neural network into a predetermined number of sections between a minimum and a maximum, (b) extracting a representative value from each of the sections divided at the step (a), (c) recording the representative values extracted from the sections at the step (b) on a codebook in a real type, and (d) substituting and recording the index values of the codebook in an integer type.

In this case, when the representative values are extracted at the step (b), a k-means algorithm may be used, or the weight values may be divided into sections having the same width and the middle value of each section may be determined and used as a representative value.

In accordance with another aspect of the present invention, a method for collecting the training data of a convolutional neural network which is used for a terminal device to recognize the card number and expiration date of a card includes the steps of (a) capturing, by the terminal device, images of different kinds of cards through a camera, (b) extracting an image patch in which positions of numbers have been designated with respect to the images of the plurality of cards captured at the step (a) and performing image processing on the extracted image patches, and (c) collecting the image patches on which image processing has been performed at the step (b).

When the image of the card is captured at the step (a), surrounding brightness may be taken into consideration.

Furthermore, when the image of the card is captured at the step (a), the slope of the camera of the terminal device may be taken into consideration.

Furthermore, at the step (b), the image processing may provide at least one of the image processing effects of a change of brightness, a change of contrast, and a blur effect.

Furthermore, at the step (b), a change of translation, scale, and rotation may be applied to the bounding box of the image of the card.

In accordance with another aspect of the present invention, a system for recognizing the card number and expiration date of a card using a terminal device includes a camera configured to capture an image of the card, an image processing unit configured to perform image processing on the image of the card, and a recognition execution device configured to recognize card numbers and expiration date numbers using a convolutional neural network.

The recognition execution device configured to recognize card numbers and expiration date numbers using a convolutional neural network includes a card number first-number position detector configured to detect the position of the first number of the card numbers in an image patch cut around the first number of the card numbers, a card number and expiration date number position detector configured to detect the positions of card numbers and expiration date numbers in an image patch cut around the card numbers, a card number recognizer configured to recognize card numbers using an image patch cut around the position obtained by the card number and expiration date number position detector as an input, an expiration date first-number detector configured to detect the position of the first number of the expiration date numbers in an image patch cut around the first number of the expiration date numbers, an expiration date number recognizer configured to recognize card numbers using an image patch cut around the position obtained by the card number and expiration date number position detector as an input, and a number binary sorter configured to determine whether each of the image patches inputted to the card number recognizer and the expiration date number recognizer corresponds to numbers.

The method for recognizing credit card numbers and an expiration date using a terminal device may be implemented in a program form and may be recorded on a recording medium readable by an electronic device or may be distributed through a program download management apparatus (e.g., a server).

BRIEF DESCRIPTION OF THE DRAWINGS

FIG. 15 is a diagram showing the result windows of a preview step, a preview step including a captured card image, and an activity step indicative of the results of recognition, which are sequentially shown from the left with respect to UX according to an embodiment of the present invention.

DETAILED DESCRIPTION

Hereinafter, a "system and method for recognizing credit card numbers and an expiration date using a terminal device" according to embodiments of the present invention are described in detail with reference to the accompanying drawings. Embodiments to be described hereunder are provided in order for those skilled in the art to easily understand the technical spirit of the present invention, and the present invention is not restricted by the embodiments. Furthermore, contents represented in the accompanying drawings have been diagrammed to easily describe the embodiments of the present invention, and the contents may be different from actually implemented forms.

Each of elements described hereinafter may be purely implemented using a hardware or software element, but may be implemented using a combination of various hardware and software elements that perform the same function. Furthermore, two or more elements may be implemented using a piece of hardware or software.

Furthermore, an expression that some elements are "included" is an expression of an "open type", and the expression simply denotes that the corresponding elements are present, but should not be construed as excluding additional elements.

Prior to a description of the embodiments of the present invention, technologies and terms used in the embodiments of the present invention are described in brief.

A convolutional neural network, that is, a kind of deep learning technology, may determine a difference between the characteristics of images through learning or training for the images and may understand and process an inputted image.

In this case, the convolutional neural network does not process data of one step as in existing learning algorithms, but has a form of several layers and processes data, thereby being capable of producing a high-dimensional result value.

The structure of the convolutional neural network is described below. The convolutional neural network has a multi-layer structure formed by stacking a layer, that is, a small-sized neuron set, in several layers, and may be configured by combining or connecting different convolution layers.

An Luhn algorithm is a checksum algorithm for authenticating a credit card or an ID number. In the Luhn algorithm, when all of the digits of a card number are sequentially read, a total value is calculated in such a manner that a value corresponding to the second digit is doubled, 1 is added to the remainder obtained by dividing the doubled value by 10 if the doubled value is greater than 9, and the doubled value is added without any change if the doubled value is smaller than 9. If the remainder obtained by dividing the total value by 10 is 0, the validity of the card number is authenticated.

A malicious input can be blocked using a simple method for distinguishing a valid number from an erroneously inputted card number or a wrong card number.

Figure 1:
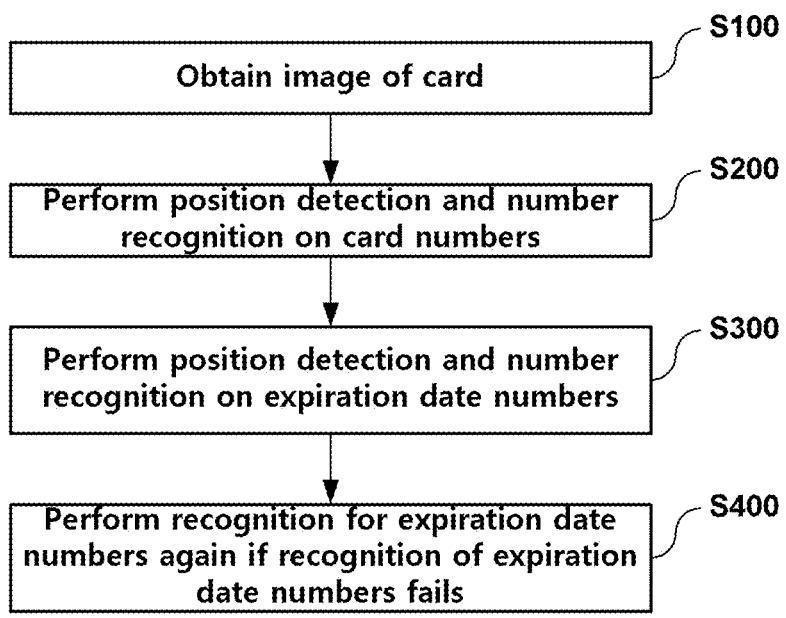
FIG. 1 is a diagram showing a method for detecting and recognizing the positions of card numbers and expiration date numbers according to an embodiment of the present invention.

FIG. 1 is a diagram showing a method for detecting and recognizing the positions of card numbers and expiration date numbers according to an embodiment of the present invention.

Referring to FIG. 1, the method for detecting and recognizing the positions of card numbers and expiration date numbers according to an embodiment of the present invention includes steps of obtaining an image of a card (S100), performing position detection and number recognition on card numbers (S200), and performing position detection and number recognition on expiration date numbers (S300). More specifically, the method for detecting and recognizing the positions of card numbers and expiration date numbers includes steps of (a) obtaining an image of a card through the camera of a terminal device (S100), (b) performing position detection and number recognition on card numbers within the image obtained at step S100 (S200), and (c) performing position detection and number recognition on expiration date numbers within the image obtained at step S100 (S300).

At step (a), an application which has an UX/UI implemented therein and is installed in the terminal device displays an image of the card recognized by a camera and obtains the image (S100). At step (b), the position and numbers of a card number are recognized in the obtained image through a series of processes using a convolutional neural network (S200). At step (c), the position and numbers of an expiration date are recognized (S300).

Such a recognition process is divided into a preview step and an activity (or recognition result window) step in order to improve a recognition effective speed.

In this case, at steps (a) to (c), recognition is performed at the preview step before the results of the recognition are produced (refer to FIG. 15)

At the preview step, if the recognition of the expiration date numbers fails, step (d) (S400) may be further performed after step (c) (S300). At step (d) (S400), position detection and number recognition may be further performed on the expiration date numbers using the image of the card, the positions of the expiration date numbers, and the format of the expiration date numbers obtained at steps (a) to (c) at the activity step (or recognition result window) (S400).

If a thread operates with respect to an inputted frame, recognition is not newly performed on the inputted frame.

At step (S400) in which position detection and number recognition are performed on the expiration date numbers again, a region of interest (ROI) for detecting the position of the first number in the expiration date numbers may be changed, and the positions of the expiration date numbers may be detected again.

In this case, the position of the ROI may be moved up to eight times up, down, left, right, and diagonally in a basic ROI, and the position of the first number in the expiration date numbers may be detected. A terminal device may use a convolutional neural network when performing the recognition of card numbers and expiration date numbers.

The terminal device is equipped with a camera and is capable of image processing and capable of having a convolutional neural network. The terminal device may be implemented in the form of an electronic device, such as a smart phone, a tablet, PC, a laptop computer, or a PDA. In addition, the terminal device may be implemented in the form of various electronic devices capable of a calculation operation and a data transmission/reception operation.

Detailed methods for performing the recognition of card numbers and expiration date numbers at the preview step are described below.

Figure 2:
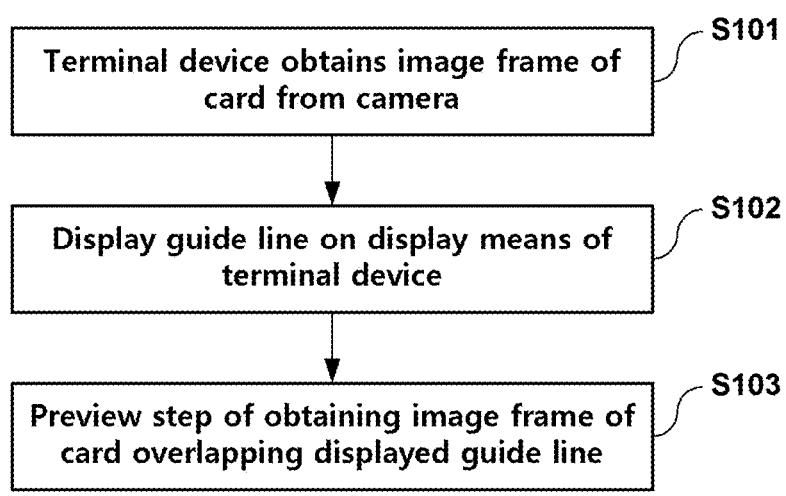
FIG. 2 is a diagram showing a method for obtaining an image of a card according to an embodiment of the present invention.

FIG. 2 is a diagram showing a method for obtaining an image of a card according to an embodiment of the present invention.

Referring to FIG. 2, the method for obtaining an image of a card according to an embodiment of the present invention includes a step of receiving the image frame of a card from the camera of the terminal device (S101), a step of displaying a guide line on the display means of the terminal device (S102), and a preview step (S103) of obtaining an image frame of the card which overlaps the displayed guide line.

In this case, if an UX/UI for displaying the guide line is used, hardware performance can be prevented from being unnecessarily wasted because unnecessary data other than an image of a card is prevented from being inputted.

The guide line may be displayed as shown in FIG. 15, but may be displayed in various ways in order to obtain only an image of a card.

Figure 3:
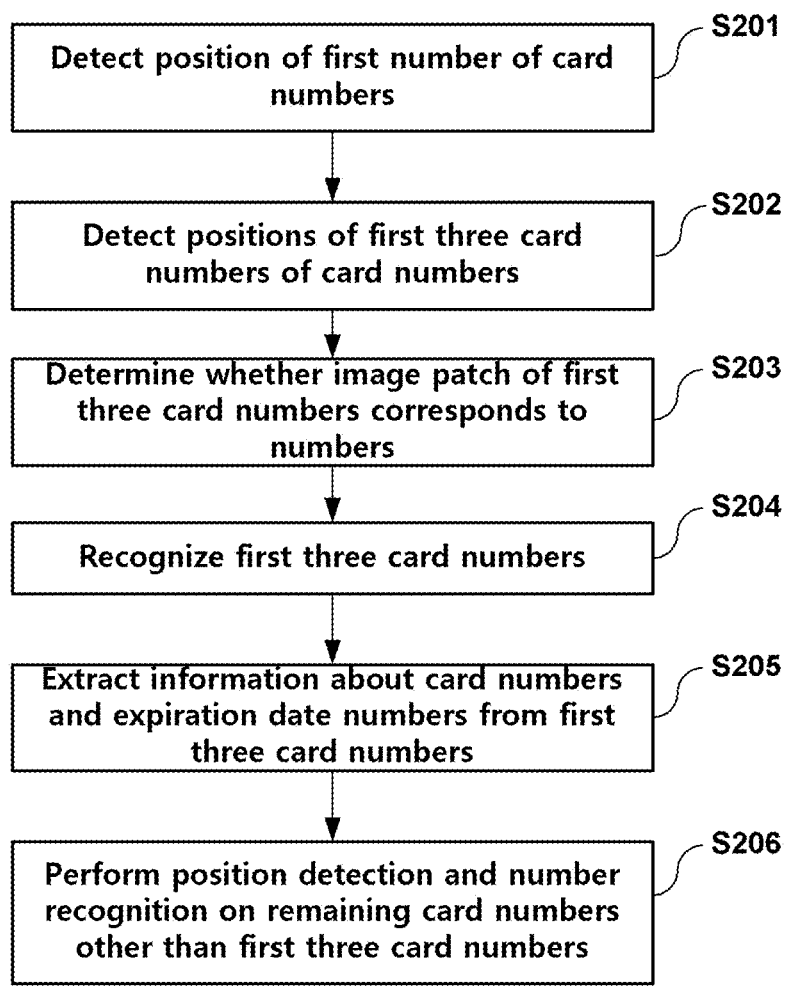
FIG. 3 is a diagram showing a method for detecting and recognizing the positions of card numbers according to an embodiment of the present invention.

FIG. 3 is a diagram showing a method for detecting and recognizing the positions of card numbers according to an embodiment of the present invention.

Referring to FIG. 3, the method for detecting and recognizing the positions of card numbers according to an embodiment of the present invention includes steps of detecting the position of the first number (S201), detecting the positions of the first three card numbers (S202), determining whether the image patch of the first three card numbers corresponds to numbers (S203), recognizing the first three card numbers (S204), extracting information about the card (S205), and performing position detection and number recognition on the remaining card numbers (S206). More specifically, the method for detecting and recognizing the positions of card numbers includes the steps of (1) detecting the position of the first number of the card numbers (S201), (2) detecting the positions of the first three card numbers of the card numbers (S202), (3) determining whether the image patch of the first three card numbers recognized at step (2) corresponds to numbers (S203), (4) comparing a recognition probability value with a predetermined threshold if, as a result of the determination at step (3), it is determined that the image patch of the first three card numbers corresponds to numbers and recognizing the first three card numbers (S204), (5) extracting information about a card type, a card number format, the positions of expiration date numbers, and the format of the expiration date numbers from the first three card numbers recognized at step (4) (S205), and (6) performing position detection and number recognition on the remaining card numbers other than the first three card numbers using the information extracted at step (5) (S206).

At step (1), the position of the first number of the card number is detected (S201). In this case, an image of only a card region cut along a guide line is used as an input image. The input image is cut with respect to a fixed ROI for detecting the first number. A mask value is calculated by passing the cut image through a first number detector network. A square indicative of the position of the first number is detected using the mask value. In this case, the position of the first number may be corrected more accurately by additionally using a number detector.

At step (2), the positions of second and third card numbers may be checked using the position of the first number obtained at step (1) (S202). First, the position of an ROI for detecting the second and the third card numbers is moved to the right by the width of the first number by taking into consideration the position of the first number. Next, the positions of the second and the third card numbers may be detected using the number detector while moving the position of the ROI up and down by taking into consideration a slope.

At step (3), whether the image patch of the obtained three card numbers corresponds to numbers may be determined using a binary sorter (S203). If, as a result of the determination, it is determined that the image patch of the obtained three card numbers does not correspond to numbers, the process may proceed to a next frame or a recognition probability value may be lowered.

At step (4), if, as a result of the determination, it is determined that the image patch of the obtained three card numbers corresponds to numbers through the image patch determination process, the first three card numbers are recognized through a number recognizer (S204).

At step (5), information about a card type, a card number format, the positions of expiration date numbers, and the format of the expiration date numbers is extracted from the first three card numbers recognized at step (4) (S205).

That is, whether the card numbers are valid card numbers may be determined using the recognized first three numbers. The reason for this is that the rule of card numbers has been predetermined for each card type, such as a VISA card or a Master card.

For example, in card companies, in the case of a VISA card, a card number starts from 4. In the case of a Master card, a card number starts from 51~55. In the case of a China UnionPay card, a card number starts from 622126-622925, 624-626, or 6282-6288. In the case of Diners Club, a card number starts from 300-305, 3095, 36, or 38-39. In the case of a Discover card, a card number starts from 60110, 60112-60114, 601174-601179, 601186-601199, 644-649, or 65. In the case of a JCB card, a card number starts from 3528-3589. Furthermore, in the card companies, a total of the digit numbers of card numbers is 14~16, and the format of an expiration date is MM/YY or MM/YYYY.

If the first three card numbers are used, a corresponding card company can be determined, and the formats of card numbers and an expiration date can also be known.

At step (6), position detection and number recognition are performed on the remaining card numbers other than the first three card numbers (S206).

Figure 4:
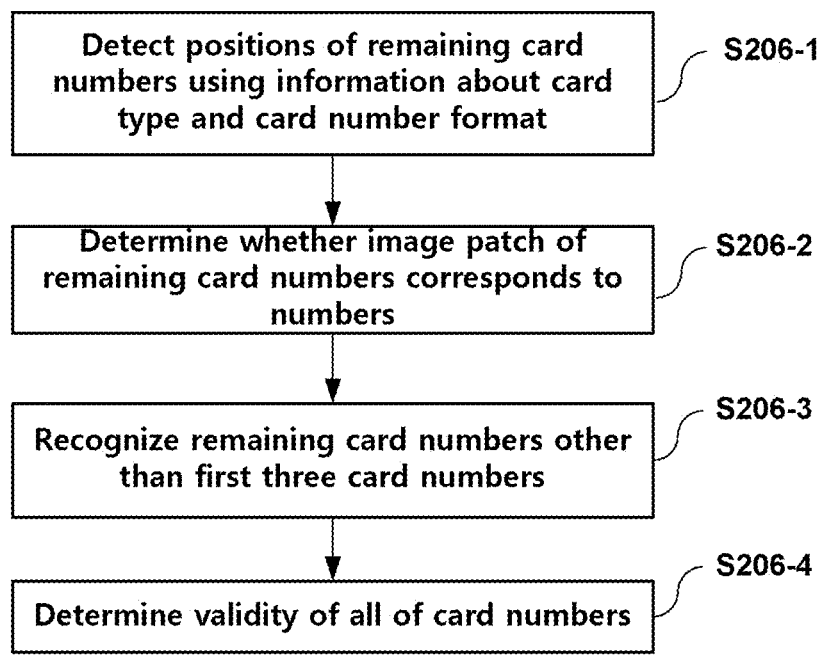
FIG. 4 is a diagram showing a method for detecting and recognizing the positions of the remaining card numbers other than the first three card numbers according to an embodiment of the present invention.

FIG. 4 is a diagram showing a method for detecting and recognizing the positions of the remaining card numbers other than the first three card numbers according to an embodiment of the present invention.

Referring to FIG. 4, the method for detecting and recognizing the positions of the remaining card numbers other than the first three card numbers using information about a card type, a card number format, the positions of expiration date numbers, and the format of the expiration date numbers obtained the first three card numbers described with reference to FIG. 3 includes steps of detecting the positions of the remaining card numbers (S206-1), determining whether the image patch of the remaining card numbers corresponds to numbers (S206-2), recognizing the remaining card numbers (S206-3), and determining the validity of the card numbers (S206-4). More specifically, the method for detecting and recognizing the positions of the remaining card numbers other than the first three card numbers includes steps of detecting the positions of the remaining card numbers using information about a card type and card number format extracted at step (5) of FIG. 3 (S206-1), determining whether the image patch of the remaining card numbers recognized at step S206-1 corresponds to numbers (S206-2), comparing a recognition probability value with a predetermined threshold if, as a result of the determination, it is determined that the image patch of the remaining card numbers corresponds to numbers and recognizing the remaining card numbers other than the first three card numbers (S206-3), and determining the validity of all the card numbers, including the recognized first three numbers and remaining card numbers, using an Luhn algorithm (S206-4).

Each of the steps is described in detail below. First, the remaining card numbers and the positions of the remaining card numbers are detected (S206-1). In this case, information about a card type, the rule of card numbers, the position of an expiration date, and the format of the expiration date is extracted using the first three card numbers of a card obtained in a previous process. The extracted information is used.

In this case, the positions of the remaining card numbers may be detected based on the card number format of a corresponding card company. The positions of the remaining card numbers may be detected using the same method as the method for detecting the positions of the first three card numbers. In general, in the case of the remaining card numbers, four of sixteen card numbers forms one set, four sets form the sixteen card numbers, and an empty space is placed between sets.

If such an empty space is present, an ROI may be moved by a factor of two times the width of an existing number in the X-axis direction. Through such a process, the first number of a next set may be put in an ROI.

Second, whether the image patch of the obtained remaining card numbers corresponds to numbers may be determined using the binary sorter (S206-2). If, as a result of the determination, it is determined that the image patch of the obtained remaining card numbers does not correspond to numbers, the process proceeds to a next frame or a recognition probability value may be reduced.

Third, if, as a result of the determination, it is determined that the image patch of the obtained remaining card numbers corresponds to numbers, the remaining card numbers are recognized using the number recognizer (S206-3).

Fourth, all the recognized card numbers may be verified using the Luhn algorithm (S206-4).

Figure 5:
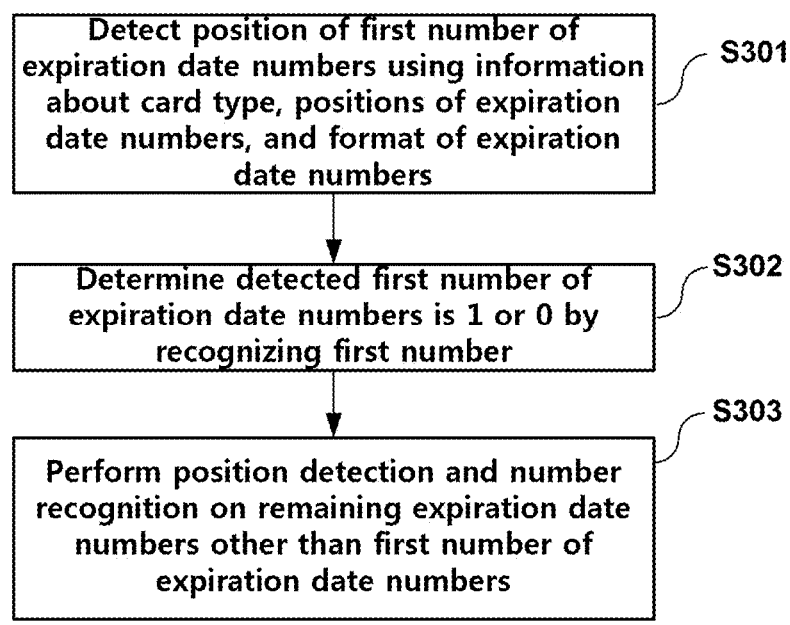
FIG. 5 is a diagram showing a method for recognizing expiration date numbers according to an embodiment of the present invention.

FIG. 5 is a diagram showing a method for recognizing expiration date numbers according to an embodiment of the present invention.

Referring to FIG. 5, the method for recognizing expiration date numbers according to an embodiment of the present invention includes steps of detecting the position of the first number of expiration date numbers (S301), determining the detected first number of the expiration date numbers (S302), and performing position detection and number recognition on the remaining expiration date numbers other than the first number (S303). More specifically, the method for recognizing expiration date numbers includes steps of detecting the position of the first number of expiration date numbers using information about a card type, the positions of the expiration date numbers, and the format of the expiration date numbers extracted at step (5) of FIG. 3 (S301), determining whether the first number of the expiration date numbers is 1 or 0 by recognizing the first number (S302), and performing position detection and number recognition on the remaining expiration date numbers other than the first number of the expiration date numbers (S303).

First, the position of the first number of expiration date numbers is detected (S301). In this case, information about the position of the expiration date, which belongs to pieces of information extracted from the results of the recognition of the first three card numbers that have been previously obtained, is used. In general, the first number of the expiration date of a credit card is placed between the eighth and ninth numbers of the card numbers. The coordinates of the position of an ROI for detecting the first number are calculated using the eighth and ninth numbers of the card numbers. An ROI corresponding to the coordinates is cut off. A mask value is calculated by passing an image, cut along the ROI, through the first number detector network. A square indicative of the position of the first number is detected using the mask value. In this case, the position of the first number may be corrected more accurately by additionally using the number detector.

Second, the first number of the expiration date obtained in the first process is recognized (S302). In this case, in the expiration date numbers, the first number of January to September is 0, and the first number of October to December is 1. Accordingly, a next process for determining whether the first number of the expiration date numbers is 0 or 1 only is performed.

Third, the positions of the remaining expiration date numbers other than the first number of the expiration date numbers are detected, and the remaining expiration date numbers are recognized (S303).

Figure 6:
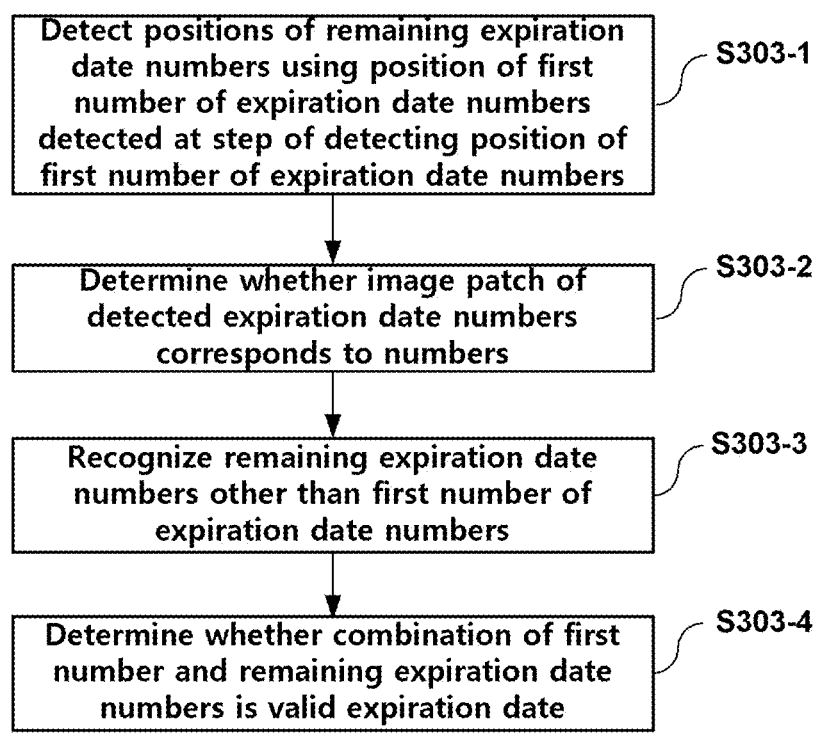
FIG. 6 is a diagram showing a method for recognizing the remaining expiration date numbers other than the first number according to an embodiment of the present invention.

FIG. 6 is a diagram showing a method for recognizing the remaining expiration date numbers other than the first number according to an embodiment of the present invention.

Referring to FIG. 6, the method for recognizing the remaining expiration date numbers other than the first number according to an embodiment of the present invention includes steps of detecting the positions of expiration date numbers (S303-1), determining whether the image patch of the detected expiration date numbers corresponds to numbers (S303-2), recognizing the remaining expiration date numbers (S303-3), and determining whether the recognized remaining expiration date numbers are valid expiration date numbers (S303-4). More specifically, the method for recognizing the remaining expiration date numbers other than the first number includes steps of detecting the positions of the remaining expiration date numbers using the position of the first number of the expiration date numbers detected at step of detecting the position of the first number of the expiration date numbers (S303-1), determining whether the image patch of the remaining expiration date numbers recognized at a step of detecting the remaining expiration date numbers corresponds to numbers (S303-2), comparing a recognition probability value with a predetermined threshold if, as a result of the determination, it is determined that the image patch of the remaining expiration date numbers corresponds to numbers and recognizing the remaining expiration date numbers other than the first number of the expiration date numbers (S303-3), and determining whether a combination of the recognized first number and remaining expiration date numbers is a valid expiration date (S303-4).

First, the positions of the remaining expiration date numbers are detected using the position of the first number of the expiration date numbers (S303-1). In this case, the ROI of the first number may be moved by the width of an existing number in the X-axis direction. Through such a process, a next number may be put in the ROI. In this case, the format of an expiration date may be MM/YYYY or MM/YY. Such a recognition format has been determined based on information obtained from the first three card numbers of the card numbers. If a slash "/" is present between the month and the year, the ROI may be moved by a factor of two times the width of an existing number in the X-axis direction.

Second, whether the image patch of the obtained remaining expiration date numbers corresponds to numbers may be determined using the binary sorter (S303-2). If, as a result of the determination, it is determined that the image patch of the obtained remaining expiration date numbers does not correspond to numbers, the process may proceed to a next frame, or a recognition probability value may be reduced.

Third, if, as a result of the determination, it is determined that the image patch of the obtained remaining expiration date numbers corresponds to numbers through the image patch determination process, the remaining expiration date numbers are recognized through the expiration date number recognizer (S303-3).

Fourth, whether all the recognized expiration date numbers correspond to a valid expiration date is determined (S303-4). In this case, if the recognized expiration date is the past or an expiration date longer than a maximum expiration date determined by each bank, the recognized expiration date is determined to be an invalid expiration date. In other cases, the recognized expiration date is determined to be a valid expiration date.

The threshold value, that is, the subject of comparison with the recognition probability value, may be different depending on the setting of a designer. Referring to FIG. 15, in the case of an expiration date, the threshold value is set to 75% for each of expiration date numbers and is set to 90% on average. In the case of a card number, the threshold value is set to 60% for each of card numbers and is set to 80% on average.

As described above, in the preview step, both card numbers and expiration date numbers are rapidly recognized. In the activity step, expiration date numbers that have not been recognized in the preview step are recognized again. In this case, if position detection and number recognition for card numbers and an expiration date fail or card numbers or an expiration date is determined to be erroneous by the binary sorter during the preview step or the activity step, a corresponding frame may be immediately rejected, the algorithm may be terminated, and the process may proceed to a next frame, for more efficient and faster recognition.

Figure 7:
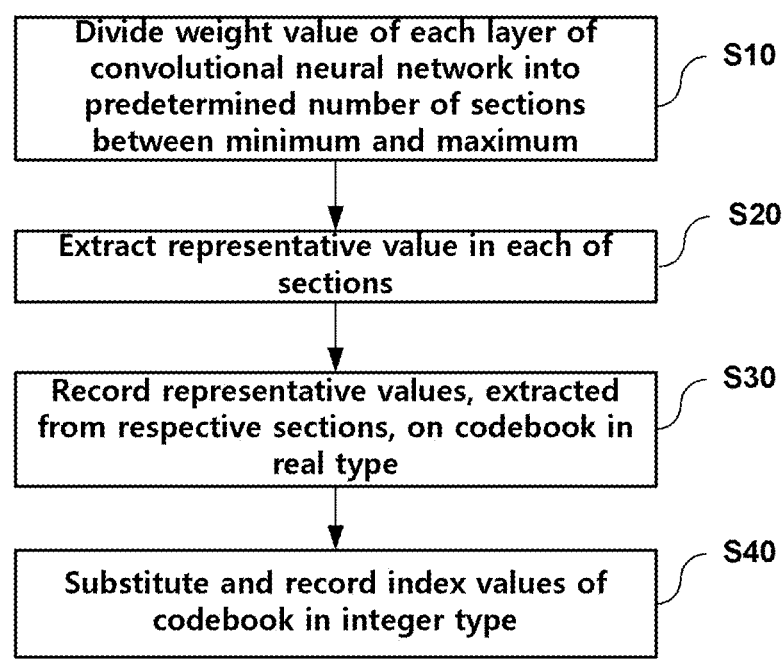
FIG. 7 is a diagram showing a method for reducing the capacity of a convolutional neural network according to another embodiment of the present invention.

FIG. 7 is a diagram showing a method for reducing the capacity of a convolutional neural network according to another embodiment of the present invention.

A deep learning network includes hundreds of thousands of parameters (i.e., weight values). The parameter values are real numbers (i.e., floats), and each occupies 4 bytes in a terminal. A convolutional neural network used in an embodiment of the present invention occupies a total capacity of about 2.7 MB in a terminal. Accordingly, in order to minimize the capacity, it is necessary to reduce the capacity to about 0.7 MB using a weight quantization scheme.

A method for reducing the capacity to about 0.7 MB is described below with reference to FIG. 7. A method for reducing the capacity of a convolutional neural network which is used for a terminal device to recognize card numbers and expiration date numbers according to another embodiment of the present invention includes steps of (a) dividing the weight values of the respective layers of the convolutional neural network into a predetermined number of sections between a minimum and a maximum (S10), (b) extracting a representative value in each of the sections at step (a) (S20), (c) recording the representative values, extracted from the respective sections at step (b), on a codebook in a real type (S30), and (d) substituting and recording the index values of the codebook in an integer type (S40).

At step (a), the weight values (or parameters) of the layers are divided into predetermined sections between a minimum and a maximum (S10). In this case, when the sections are divided between the minimum weight value and the maximum weight value, they may be divided into a predetermined number "n" according to an algorithm. Furthermore, the number of sections that may be divided is a maximum of 256.

At step (b), representative values are extracted in the divided sections (S20).

At step (c), the representative values extracted at step (b) are recorded on a codebook in a real type (S30). In this case, the codebook may have indices corresponding to respective locations where the stored representative values are placed.

At step (d), the index values of the codebook are substituted and recorded in an integer type (S40). That is, the representative values have been recorded on the codebook in a real type. The index values indicative of respective locations where the representative values have been stored are recorded on the codebook in an integer type (i.e., a byte form). Accordingly, there is an advantage in that 4 bytes occupied by a real type is compressed into 1 byte.

When the representative values are extracted, a k-means algorithm may be used, or the weight values may be divided into sections having the same width and the middle value of each section may be determined and used as a representative value. As described above, the representative value may be determined using the two methods. The number "n" of sections divided using the two methods may be different. This may be determined by a designer within the most efficient range according to a selected algorithm.

In this case, efficient weight quantization can be performed because the capacity of the codebook is relatively smaller than a compressed capacity.

Figure 8:
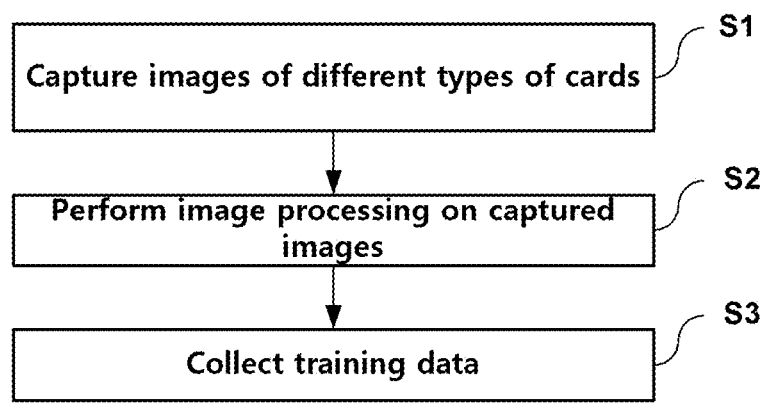
FIG. 8 is a diagram showing a method for collecting the training data of a convolutional neural network according to another embodiment of the present invention.

FIG. 8 is a diagram showing a method for collecting the training data of a convolutional neural network according to another embodiment of the present invention.

Referring to FIG. 8, the method for collecting the training data of a convolutional neural network includes steps of capturing images of cards (S1), performing image processing (i.e., data augmentation) (S2), and collecting images (S3). More specifically, the method for collecting the training data of a convolutional neural network includes steps of (a) capturing, by the terminal device, images of different kinds of cards using the camera (S1), (b) extracting an image patch in which the position of each of numbers has been designated with respect to each of the images of the plurality of cards captured at step (a) and performing image processing on the extracted image patch (S2), and (c) collecting the image patches on which image processing has been performed at step (b) (S3).

At step (a), the terminal device captures an image of a card through the camera. In this case, images of various card types may be captured (S1). For example, images of various kinds, such as VISA and Master, may be captured. An image of each card type may be captured through such a process. In this case, a designer designates the positions of numbers and performs a labeling task for assigning a label, with respect to each of the plurality of images. Image patches may be separated using the positions of the numbers obtained through such a labeling task.

At step (b), an image patch in which the positions of the numbers have been designated is extracted with respect to each of the images of the plurality of cards captured at step (a). Image processing is performed on the extracted image patch (S2).

At step (c), the image processed images are collected. The convolutional neural network may be trained through the images collected as described above (S3).

Various images may be generated through the type of cards and the image processing process at steps (a) to (c).

When the image of the card is captured at step (a), it may be captured by taking into consideration surrounding brightness or captured by taking into consideration the slope of the camera of the terminal device.

More specifically, after several sheets of different credit cards are secured, the credit cards are photographed in a dark place where only "white light", "yellow light", or "ambient light" is present. In this case, the credit cards may be photographed using four different cameras, and the slope of each camera may be differently set in three steps.

Furthermore, when image processing is performed at step (b), the number of images may be increased by applying a change of brightness, a change of contrast, and a blur effect to the data of the collected image patch.

Furthermore, different image data may be collected by applying a change of translation, scale, and rotation to the bounding box of an image of a card. The collected image data has been considered assuming various situations in recognizing a credit card. As described above, overfitting can be prevented through such a purified data collection process.

In this case, the term "overfitting" means a case where if a return type or sorting model capable of analyzing a sample group has been derived through the sample group, an analysis power is reduced on the contrary when the sample group is applied to an actual population if the sample group becomes excessively suitable. Although a model is less suitable for a sample group, it may be more suitable when the model is applied to a population. Accordingly, an overfitting error may need to be taken into consideration when a return type or a sorting model is derived.

If the training data of a convolutional neural network is collected in various ways at a proper level as described above, there are advantages in that the overfitting problem can be prevented and recognition performance can be improved because a recognizable domain is maximized.

Figure 9:
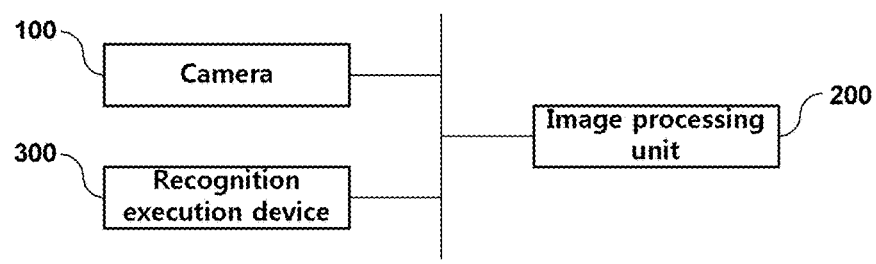
FIG. 9 is a diagram showing a system for recognizing card numbers and expiration date numbers according to an embodiment of the present invention.

FIG. 9 is a diagram showing a system for recognizing card numbers and expiration date numbers according to an embodiment of the present invention.

Referring to FIG. 9, the system for recognizing card numbers and expiration date numbers according to an embodiment of the present invention includes a camera 100, an image processing unit 200, and a recognition execution device 300 using a convolutional neural network. More specifically, the system includes the camera 100 configured to capture an image of a card, the image processing unit 200 configured to perform image processing on the image of the card, and the recognition execution device 300 using a convolutional neural network for recognizing card numbers and expiration date numbers.

Each of the camera 100, the image processing unit 200, and the recognition execution device 300 using a convolutional neural network may be implemented using a processor for executing a program on a computing device.

As described above, the camera 100, the image processing unit 200, and the recognition execution device 300 using a convolutional neural network may be implemented using respective elements that are physically independent or may be implemented in such a way as to be functionally separated within a single processor.

Furthermore, the image processing unit 200 and the recognition execution device 300 using a convolutional neural network may include at least one operation device. In this case, the operation device may be a general-purpose central processing unit (CPU), a programmable device (CPLD, FPGA) suitably implemented for a specific purpose, an application-specific integrated circuit (ASIC), a microcontroller chip or a graphic processing unit (GPU).

Figure 10:
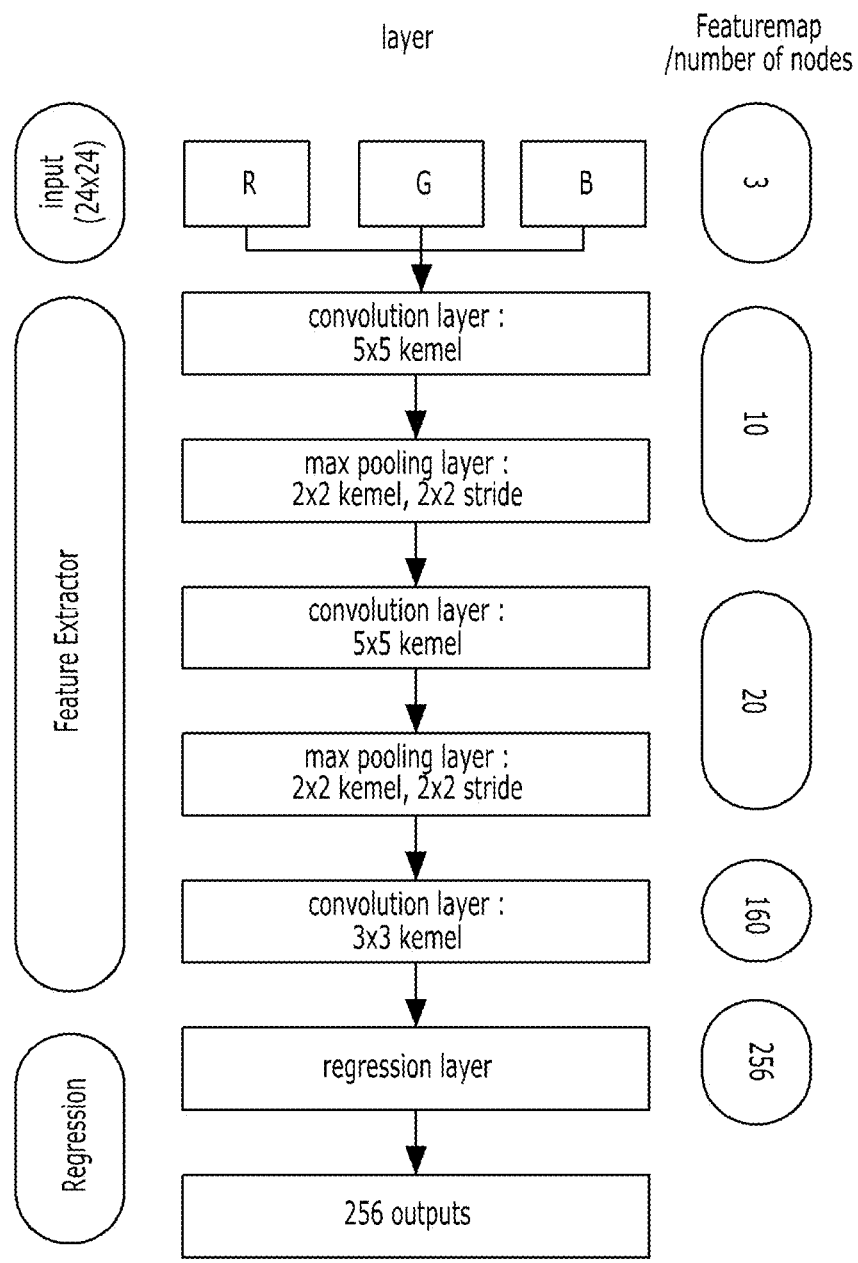
FIG. 10 is a diagram showing the first number detector of a convolutional neural network according to an embodiment of the present invention.

FIG. 10 is a diagram showing the card number and expiration date first-number detector of a convolutional neural network according to an embodiment of the present invention.

Figure 11:
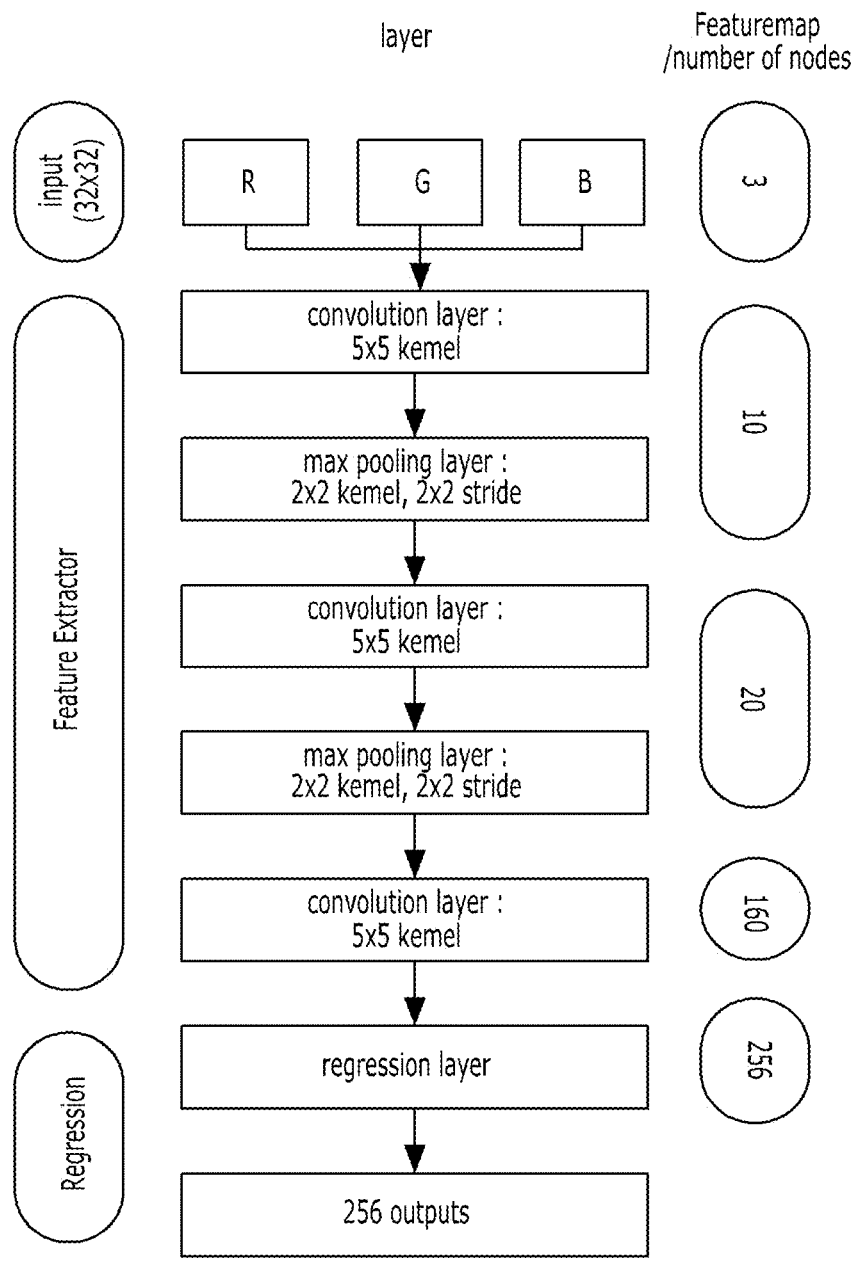
FIG. 11 is a diagram showing the number detector of a convolutional neural network according to an embodiment of the present invention.

FIG. 11 is a diagram showing the card number and expiration date detector of a convolutional neural network according to an embodiment of the present invention.

Figure 12:
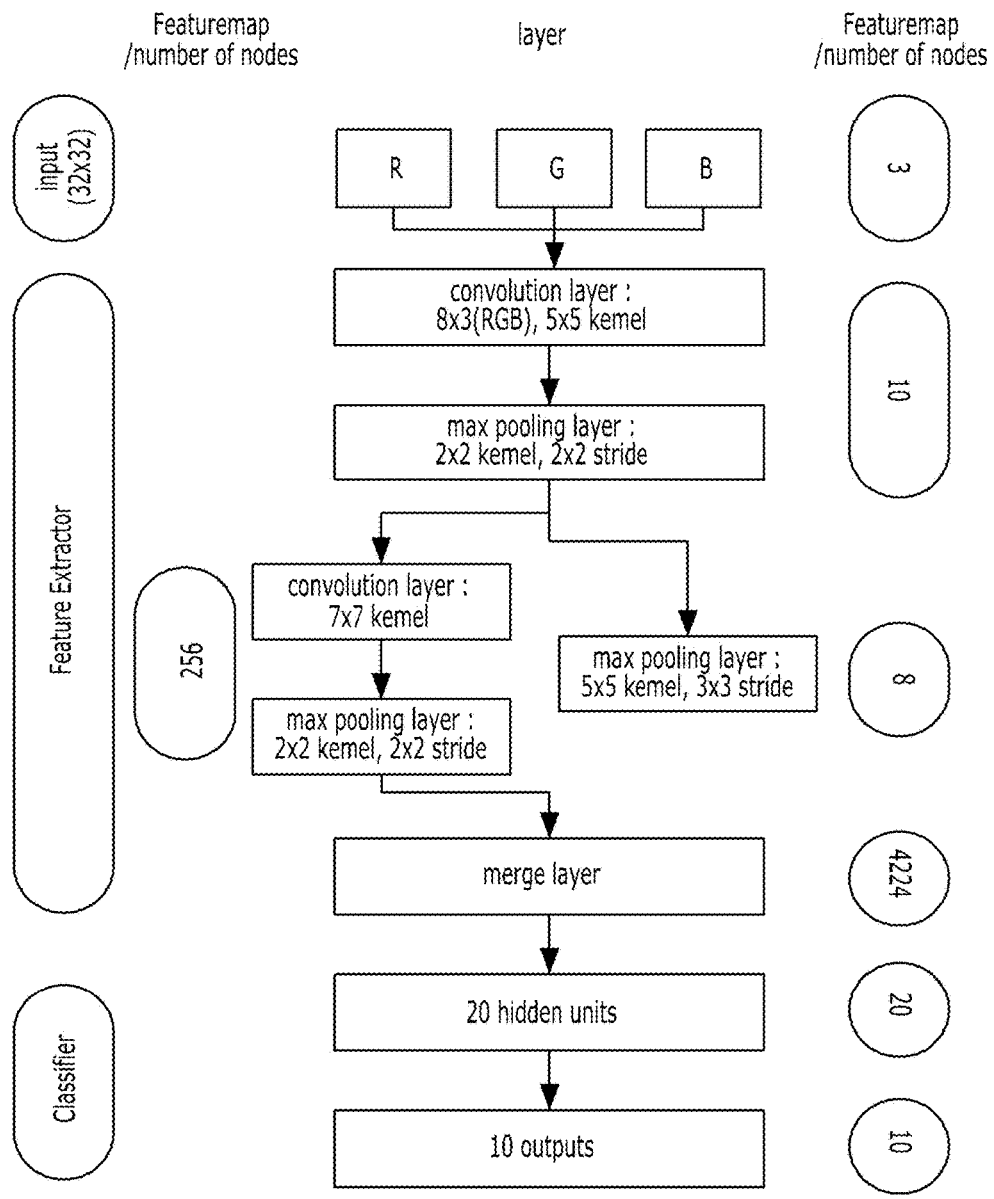
FIG. 12 is a diagram showing the number recognizer (i.e., the card number recognizer and the expiration date recognizer) of a convolutional neural network according to an embodiment of the present invention.

FIG. 12 is a diagram showing the card number and expiration date number recognizer of a convolutional neural network according to an embodiment of the present invention.

Figure 13:
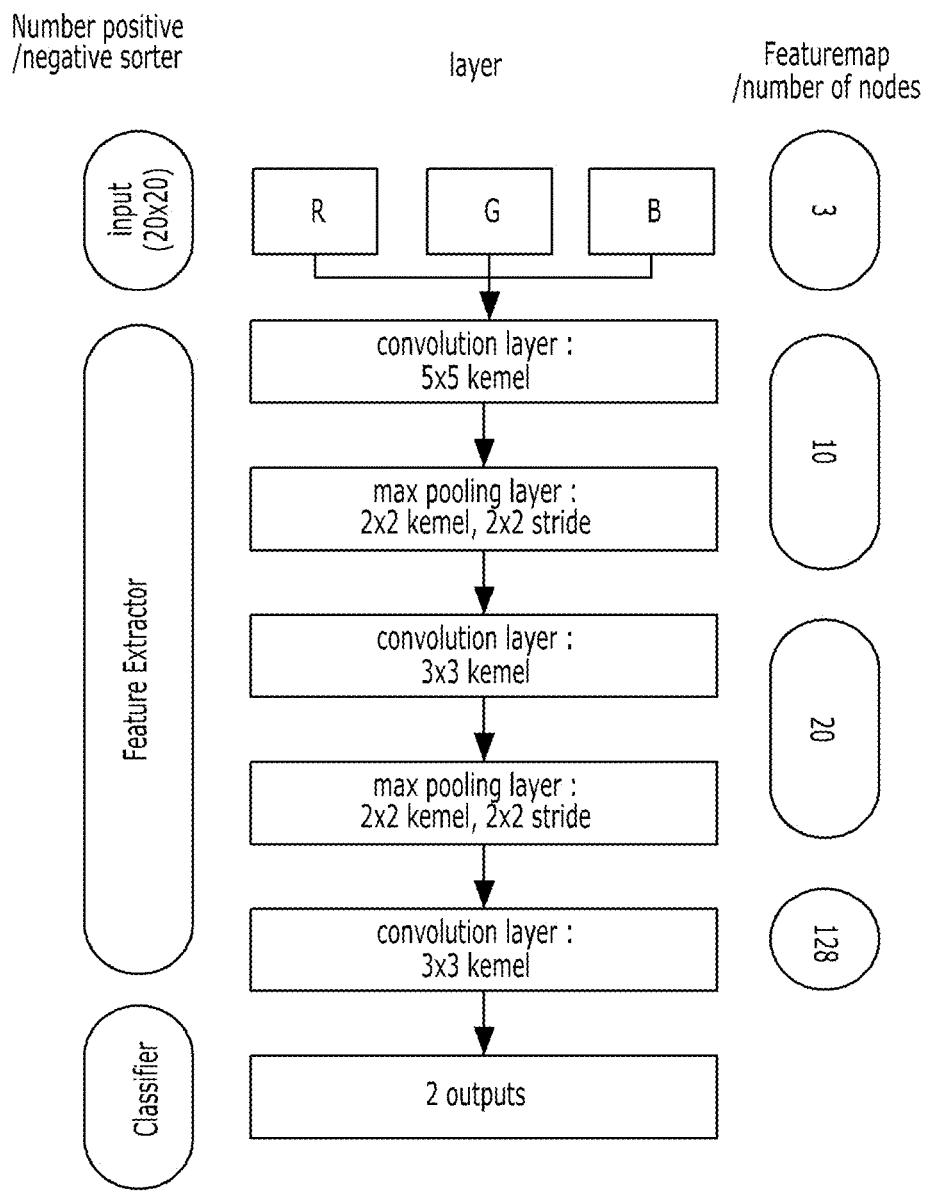
FIG. 13 is a diagram showing the number binary sorter of a convolutional neural network according to an embodiment of the present invention.
Figure 14:
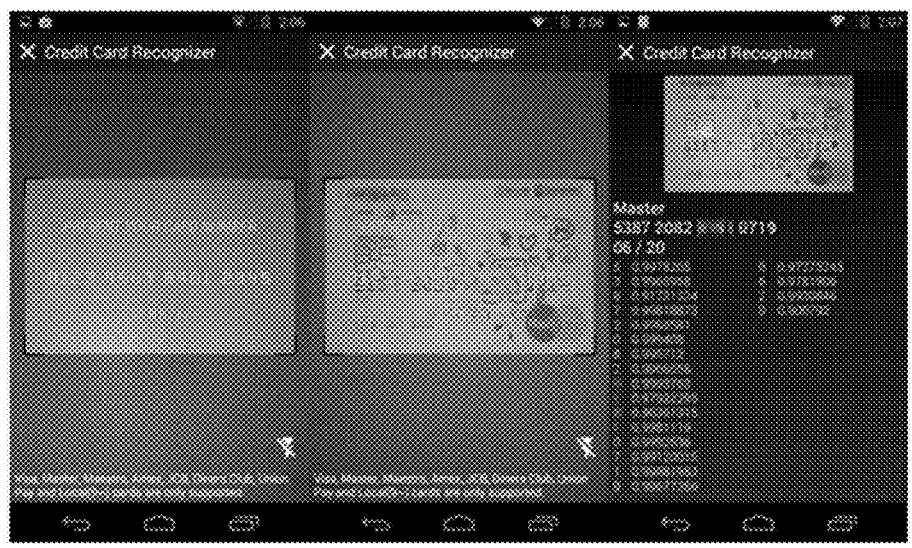
FIG. 14 is a diagram showing the state in which card numbers and expiration date numbers have been recognized according to an embodiment of the present invention.

FIG. 13 is a diagram showing the number binary sorter of a convolutional neural network according to an embodiment of the present invention.

Referring to FIGS. 10 to 13, the recognition execution device 300 using a convolutional neural network according to an embodiment of the present invention includes the card number first-number position detector, the card number and expiration date number position detector, the card number recognizer, the expiration date first-number detector, the expiration date number recognizer, and the number binary sorter. More specifically, the recognition execution device 300 includes a card number first-number position detector configured to detect the position of the first number of card numbers in an image patch cut around the first number of the card numbers, a card number and expiration date number position detector configured to detect the positions of card numbers and expiration date numbers in the image patch cut around the card numbers, a card number recognizer configured to recognize the card numbers using an image patch, cut around the location obtained by the card number and expiration date number position detector, as an input, an expiration date first-number detector configured to detect the position of the first number of the expiration date numbers in the image patch cut around the first number of expiration date numbers, an expiration date number recognizer configured to recognize card numbers using the image patch, cut around the position obtained by the card number and expiration date number position detector, as an input, and a number binary (positive/negative) sorter configured to determine whether each of the image patches inputted to the card number recognizer and the expiration date number recognizer corresponds to numbers.

The recognition execution device 300 using a convolutional neural network includes multiple layers as described above. The convolutional neural network according to an embodiment of the present invention is described in detail below.

Referring to FIG. 10, the card number first-number position detector is used to detect the position of the first number of card numbers in an image patch cut around the first number, and is a regression network using an image patch of a 24×24 size as an input and using a mask of a 16×16 size as an output.

The card number first-number position detector includes an input network, a characteristic extraction network, and a regression network. The input network separates an input image into the R, G, and B colors. The characteristic extraction network includes three convolution layers and two max pooling layers.

In this case, each of the two convolution layers of the characteristic extraction network has a 5×5 kernel, and the last convolution layer thereof has a 3×3 kernel. The two max pooling layers and the two of the convolution layers are alternately present, and each has a 2×2 kernel and a 2×2 stride.

More specifically, the convolution layer has a square window of an "n×n" pixel size, and performs convolution operation while moving its position on an image of a specific size greater than the "n×n" pixel size.

In this case, the convolution layer functions as a kind of filter for extracting an edge of a specific shape. For example, if the convolution layer performs convolution as a filter for extracting a longitudinal edge, an output image on which only a longitudinal edge appears is generated.

The max pooling (or sub-sampling) layer functions to designate the region of an "n×n" pixel size on input image, take only the greatest value in the designated region, and generate a new output. The max pooling layer may be used to extract only a portion having the greatest response in an image, thereby reducing the size of an image and also enabling the recognition of numbers and the detection of the position although the positions of the numbers are slightly inclined to the side not to the very middle. The max pooling layer can reduce a computational load by reducing values other than a maximum value.

The regression network has a regression layer and outputs a mask result value of a 16×16 size (256 in number). The regression network may be used to search for a required region when an image patch is inputted.

The kernel and stride used in the convolution layer and the max pooling layer are described below. The 5×5 kernel and the 2×2 stride in an input image of a 32×32 size means that convolution operation is performed while moving on an image of a 5×5 size window by two blanks in the x axis and two blanks in the y axis.

Referring to FIG. 11, the card number and expiration date number detector is used to detect the accurate positions of numbers in an image patch cut around the numbers of a card number, and is a regression network using an image patch of a 32×32 size as an input and using a mask of a 16×16 size as an output.

The card number and expiration date number detector includes an input network, a characteristic extraction network, and a regression network. The input network separates an input image into the R, G, and B colors.

The characteristic extraction network includes three convolution layers and two max pooling layers. In this case, each of the three convolution layers has a 5×5 kernel. The max pooling layer between the two convolution layers has a 2×2 kernel and a 2×2 stride.

Referring to FIG. 12, the card number recognizer is used to determine corresponding numbers using an image patch, cut around the position of a card number obtained by a No. 2 detector, as an input. The card number recognizer uses an image patch of a 32×32 size as an input and outputs the determined one-digit number (0 to 9).

In the case of the number recognizer of FIG. 12, the card number recognizer and the expiration date recognizer are separated, but the network structure is the same as that of FIG. 12.

The card number recognizer includes an input unit, a characteristic extraction unit, and a determination unit. The input unit receives the R, G, and B channels of an image as an input.

The characteristic extraction network includes two convolution layers, three max pooling layers, and a merge layer. In this case, the two convolution layers have a 5×5 kernel and a 7×7 kernel, respectively. Each of the two max pooling layers has a 2×2 kernel and a 2×2 stride, and the remaining one max pooling layer has a 5×5 kernel and a 3×3 stride.

In this case, the convolution layer, that is, the first layer, has a 8×3 (RGB) and a 5×5 kernel. A next max pooling layer has a 2×2 kernel and a 2×2 stride. An image that has passed through the max pooling layers is transferred to the max pooling layer having a 5×5 kernel and a 3×3 stride and the convolution layer having a 7×7 kernel. After the image passes through the convolution layer having a 7×7 kernel, it passes through the max pooling layer having a 2×2 kernel and a 2×2 stride and is transferred to a classification network via the merge layer.

The classification network has 20 hidden units and generates 10 (i.e., 0 to 9) output values.

In this case, the hidden units are present in a hidden layer. The hidden layer is present between the input layer and output layer of the recognition execution device 300 using a convolutional neural network. The hidden layer processes the linear combination of parameter values, transferred by the input layer, in a non-linear function and transfers the processed results to an output layer or another hidden layer. In the recognition execution device 300 using a convolutional neural network, the hidden layer may be present in several layers, and several hidden units may be included in each hidden layer.

Referring to FIG. 10, the expiration date first-number detector uses an image patch, cut around the first number of the expiration date of a card, as an input. The remaining contents are the same as those of the card number first-number detector.

Referring to FIG. 12, the expiration date number recognizer uses an image patch, cut around the position of a card expiration date number obtained by a No. 5 detector, as an input. The remaining contents of the expiration date number recognizer are the same as those of the card number recognizer.

Referring to FIG. 13, the number binary sorter is used to supplement the number recognizer. The number binary sorter is used to determine whether the numbers of a corresponding image patch are correct (i.e., positive) or correspond to an erroneous image patch not numbers, such as a background (i.e., negative), by resizing the image patch of the number recognizer to a 20×20 size and passing the resized image patch through the sorter. If, as a result of the determination, it is determined that the numbers of a corresponding image patch are negative, the number binary sorter reduces confidence (i.e., a probability value) for the output of the number recognizer.

The number binary sorter includes an input unit, a characteristic extraction unit, and a determination unit. The input unit receives the R, G, and B channels of an image as inputs.

The characteristic extraction network includes three convolution layers and two max pooling layers. In this case, one of the three convolution layers has a 5×5 kernel, and the two of the three convolution layers have 3×3 kernels. The first convolution layer of the characteristic extraction network has a 5×5 kernel. Each of the max pooling layers is present between the convolution layers and has a 2×2 kernel and a 2×2 stride.

The classification network calculates two output values, and is used to determine whether the numbers of a corresponding image patch are positive or negative. If, as a result of the determination, it is determined that the image patch corresponds to numbers, the classification network determines the image patch to be positive. If, as a result of the determination, it is determined that the image patch corresponds to an erroneous image, such as a background, other than numbers, the classification network determines the image patch to be negative.

If the recognition execution device 300 using a convolutional neural network according to an embodiment of the present invention is used as described above, a recognition rate can be improved compared to an image processing-based technology. Although there is a restriction to the hard disk capacity of a terminal device due to the use of the weight quantization technology, the recognition execution device 300 using a convolutional neural network according to an embodiment of the present invention can be included in the terminal device.

In this case, there may be a restriction to hardware performance of the terminal device. If the terminal device executes the recognition system according to an embodiment of the present invention, the performance restriction problem can be avoided by obtaining an image of a required portion in a UX/UI manner.

Furthermore, if the terminal device executes the recognition system according to an embodiment of the present invention, a restriction to hardware performance of the terminal device can be avoided through image recognition for each step and a recognition effective speed can be increased because a recognition process is divided into the preview step and the activity (or recognition result window) step in a UX/UI manner. Furthermore, from a viewpoint of security, if the terminal device executes the recognition system according to an embodiment of the present invention, there is an advantage in that an abuse of the present invention can be prevented by recognizing both card numbers and expiration date numbers in the preview step and allowing a user to change his or her card.

The method for recognizing credit card numbers and an expiration date using a terminal device may be written in a program form. Pieces of code and code segments forming the program may be easily reasoned by a programmer skilled in the art. Furthermore, the program regarding the method for recognizing credit card numbers and an expiration date using a terminal device may be stored in information storage media readable by an electronic device and may be read and executed by an electronic device.

Various embodiments are described below. First, an embodiment of FIG. 15 is described. A total of four credit card figures are sequentially described downward from a credit card figure at the top of FIG. 15. First, a slash square region is indicative of a fixed ROI. In the fixed ROI, the position of the first number "1" of card numbers may be detected (i.e., a solid line square). After the position of the first number is detected and then the positions of the second and the third numbers of the card numbers, that is, 2 and 3, are detected as described above, the numbers "1", "2", "3" are recognized as in the second credit card figure. In FIG. 15, numbers indicated by arrows mean the results of recognized numbers. Thereafter, in the third credit card figure, a process for sequentially recognizing all the remaining card numbers is performed. In the last credit card figure, an expiration date is recognized, and recognition for the credit card numbers and the expiration date is performed.

Credit card numbers proposed in the following embodiments correspond to sample credit card number which may pass the Luhn algorithm.

Embodiment 1

If a credit card is a VISA card (e.g., a card number: 4111-1111-1111-1111 and an expiration date: 08/16), first, the position of the first number "4" of the card number may be detected within a fixed ROI (i.e., a solid line square). After the position of the first number is detected and then the positions of the second and the third numbers are detected as described above, the first three card numbers are recognized, and thus a corresponding card company may be determined to be VISA Inc. Information about the formats of the expiration date and credit card number of the VISA card is obtained. Next, "4111-1111-1111-1111", that is, all of the card numbers, is recognized by performing position detection and number recognition on the remaining card numbers. In order to verify the validity of the card number, the Luhn algorithm is put in the card number. As a result of the verification, the card number is found to be a valid card number. Thereafter, the position of the first number of the expiration date is detected. The position of the first number of the expiration date is detected and recognized. The first number of the expiration date is determined to be "0". "0", "8", "1", "6" are extracted by recognizing all of the remaining numbers of the expiration date. As a result, "0", "8", "1", "6" do not correspond to the past expiration date and an expiration date exceeding a term permitted by VISA Inc. Accordingly, all the recognized numbers of the expiration date correspond to a valid credit card expiration date, and thus both the card number and the expiration date may be validly recognized.

Embodiment 2

If a credit card is a Master card (e.g., a card number: 5111-1111-1111-1118 and an expiration date: 08/16), first, the position of the first number "5" of the card number may be detected in a fixed ROI (i.e., a solid line square). After the position of the first number is detected and then the positions of the second and the third numbers are detected as described above, the first three card numbers are recognized, and thus a corresponding card company may be determined to be MasterCard. Information about the formats of the expiration date and credit card number of the Master card is obtained. "5111-1111-1111-1118", that is, all of the card numbers, is recognized by performing position detection and number recognition on the remaining card numbers. In order to verify the card number, the Luhn algorithm is put in the card number. As a result of the verification, the card number is found to be a valid card number. Thereafter, the position of the first number of the expiration date is detected. The position of the first number of the expiration date is detected and recognized. The first number of the expiration date is determined to be "0". "0", "8", "1", "6" are extracted by recognizing all of the remaining numbers of the expiration date. As a result, "0", "8", "1", "6" do not correspond to the past expiration date and an expiration date exceeding a term permitted by MasterCard. Accordingly, all the recognized numbers of the expiration date correspond to a valid credit card expiration date, and thus both the card number and the expiration date may be validly recognized.

As described above, those skilled in the art to which the present invention pertains will appreciate that the present invention may be implemented in other detailed forms without changing the technical spirit or essential characteristic of the present invention. Accordingly, it is to be understood that the aforementioned embodiments are only illustrative, but are not limiting or restrictive. Furthermore, the flowcharts shown in the drawings are merely sequential order illustrated to achieve the most preferred results in implementing the present invention, and other additional steps may be provided or some of the steps may be deleted.

Technological characteristics described in this specification and an implementation for executing the technological characteristics may be implemented using a digital electronic circuit, may be implemented using computer software, firmware or hardware including the structure described in this specification and structural equivalents thereof, or may be implemented using a combination of one or more of them. Furthermore, the implementation for executing the technological characteristics described in this specification may be implemented using a computer program product, that is, a module regarding computer program instructions encoded on a kind of program storage media in order to control the operation of a processing system or for execution by the processing system.

A computer-readable medium may be a machine-readable storage device, a machine-readable storage substrate, a memory device, a composition of materials that affect a machine-readable electromagnetic signal or a combination of one or more of them.

In this specification, the terms "apparatus" or "system" cover all apparatuses, devices, and machines for processing data, for example, including a processor, a computer or a multi-processor, or a computer. The processing system may include, for example, code that forms processor firmware, a protocol stack, a database management system, an operating system, or all types of code that form an execution environment for a computer program when a combination of one or more of them is requested, in addition to hardware.

A computer program also known as a program, software, a software application, a script or code may be written in any form of a programming language which includes a compiled or interpreted language or a transcendental and/or procedural language, and may also be implemented in any form including an independent program or module, a component, a subroutine or other units suitable for being used in a computer environment.

The computer program does not need to necessarily correspond to a file of a file system. The program may be stored in a single file provided to a requested program, multiple files that interact with each other (e.g., a file that stores one or more modules, a lower program or part of code), or another program or part of a file including data (e.g., one or more scripts stored in markup language document).

The computer program may be placed in a single site or distributed to a plurality of sites and may be implemented to be executed on multiple computers or one or more computers interconnected over wired/wireless communication networks.

A computer-readable medium suitable for storing computer program instructions and data may include semiconductor memory devices, such as EPROM, EEPROM, and a flash memory device, for example, all types of non-volatile memory, media, and memory devices including magnetic disks, such as an internal hard disk or an external disk, magneto optical disks, CDs, and DVDs. The processor and the memory may be supplemented by a logic circuit for a special object or may be integrated into the logic circuit for a special object.

An implementation for executing the subject matter described in this specification may be implemented in an operation system including a backend component, such as a data server, a middleware component, such as an application server, a frontend component, such as a client computer having a web browser or graphic user interface capable of interacting with the implementation of the subject matter described by a user in this specification or all combinations of one or more of the backend, middleware, and frontend components. The component of the system may be accessed by any type or medium for digital data communication, such as a communication network.

Hereinafter, a more detailed embodiment capable of implementing the elements included in the system and method for recognizing the credit card number and expiration date of a credit card using a terminal device, described in this specification, along with the aforementioned contents is described in detail.

The system and method for recognizing the credit card number and expiration date of a credit card using a terminal device, which have been described in this specification, may be used partially or generally through a server related to a client device or web-based storage system or means for executing computer software, program code or instructions on one or more processors included in a server. In this case, the processor may be part of a server, a client, network infrastructure, or a computing platform, such as a mobile computing platform or fixed computing platform. More specifically, the processor may be a kind of computer or processing device capable of executing program instructions, code, etc. Furthermore, the processor may further include memory for storing the method, instructions, code or program for recognizing the credit card number and expiration date of a credit card using a terminal device. If memory is not included in the processor, the processor may access a storage device, such as CD-ROM, DVD, memory, a hard disk, a flash drive, RAM, ROM, or a cache in which the method, instructions, code or program for recognizing the credit card number and expiration date of a credit card using a terminal device.

Furthermore, the system and method for recognizing the credit card number and expiration date of a credit card using a terminal device, which have been described in this specification, may be used partially or generally through an apparatus for executing computer software on a server, a client, a gateway, a hub, a router or network hardware. In this case, the software may be executed in various types of servers, such as a file server, a print server, a domain server, an Internet server, an intranet server, a host server, and a distributed server. The aforementioned servers may further include memory, a processor, a computer-readable storage medium, a storage medium, a communication device, a port, a client, and an interface capable of accessing other servers over wired/wireless networks.

Furthermore, the method, instructions, or code for recognizing the credit card number and expiration date of a credit card using a terminal device may also be executed by a server. Other devices required to execute the method for recognizing the credit card number and expiration date of a credit card using a terminal device may be implemented as part of a hierarchical structure associated with the server.

Furthermore, the server may provide an interface to other devices including a client, another server, a printer, a database server, a print server, a file server, communication a server, and a distributed server without limitation. A connection through the interface may enable a program to be easily executed at a remote place over wired/wireless networks.

Furthermore, any one of devices connected to the server through the interface may further include at least one storage device capable of storing the method, instructions or code for recognizing the credit card number and expiration date of a credit card using a terminal device. The central processor of the server may provide instructions, code, etc. to be executed on another device to the device so that the instructions, code, etc. are stored in a storage device.

The system and method for recognizing the credit card number and expiration date of a credit card using a terminal device, which have been described in this specification, may be used partially or generally through network infrastructure. In this case, the network infrastructure may include all of devices, such as a computing device, a server, a router, a hub, a firewall, a client, a personal computer, a communication device, and a routing device, and separate modules capable of executing respective functions. The network infrastructure may further include storage media, such as story flash memory, a buffer, a stack, RAM, and ROM, in addition to the aforementioned devices and module. Furthermore, the method, instructions or code for recognizing the credit card number and expiration date of a credit card using a terminal device may also be executed by and stored in any one of the device, module, and storage medium included in the network infrastructure. Another device required to execute the method for recognizing the credit card number and expiration date of a credit card using a terminal device may also be implemented as part of the network infrastructure.

Furthermore, the system and method for recognizing the credit card number and expiration date of a credit card using a terminal device, which have been described in this specification, may be implemented using hardware or hardware suitable for a specific application and software. In this case, the hardware includes all of general-purpose computer devices, such as a personal computer and a mobile communication terminal, and a business type specific computer device. The computer device may be implemented using a device, such as memory, a microprocessor, a microcontroller, a digital signal processor, an application-specific integrated circuit, a programmable gate array, programmable array logic or a combination of them.

The aforementioned computer software, instructions, code, etc. may be stored or accessed by a readable device. In this case, the readable device may include memory, such as a computer component including digital data used for computing for a specific time, semiconductor storage, such as RAM or ROM, permanent storage, such as an optical disk, high-capacity storage, such as a hard disk, a tape and a drum, optical storage, such as a CD or DVD, and network access type storage, such as flash memory, a floppy disk, a magnetic tape, a paper tape, an independent type RAM disk, high-capacity storage detachable from a computer, dynamic memory, static memory, variable storage, and cloud. In this case, the instructions, code, etc. include all of languages, such as data-oriented languages, such as SQL and dBase, system languages, such as C, Objective C, C++, and Assembly, architecture languages, such as Java and NET, and application languages, such as PHP, Ruby, Perl, and Python, but are not limited thereto. The instructions, code, etc. may include all of languages widely known to those skilled in the art to which the present invention pertains.

Furthermore, the "computer-readable medium" described in this specification includes all of media which contribute to the provision of instruction to a processor in order to execute a program. More specifically, the "computer-readable medium" includes non-volatile media, such as a data storage device, an optical disk and a magnetic disk, volatile media, such as dynamic memory, and transmission media, such as a coaxial cable, a copper wire and an optical fiber for sending data, but is not limited thereto.

The elements for executing the technical characteristics of the present invention included in the block diagrams and flowcharts shown in the accompanying drawings of this specification mean the logical boundary between the elements.

In accordance with software or hardware embodiments, however, the functions of the illustrated elements and functions thereof may be implemented so that the elements and functions thereof are executed in the form of an independent software module, a monolithic software structure, code, a service or a combination of them and are stored in a medium which is executable by a computer including a processor capable of executing stored program code and instructions. Accordingly, all of such embodiments should be construed as belonging to the scope of the present invention.

Accordingly, the accompanying drawings and technologies thereof describe the technical characteristics of the present invention, but should not be simply reasoned unless a specific array of software for implementing such technical characteristics is clearly described otherwise. That is, the aforementioned various embodiments may be present and may be partially modified while having the same technical characteristics as those of the present invention. Accordingly, such modified embodiments should be construed as belonging to the scope of the present invention.

Furthermore, the flowchart describes operations in the drawing in a specific sequence, but has been illustrated to obtain the most preferred results. It should not be understood that such operations must be executed or all the illustrated operations must be executed in the illustrated specific sequence or sequential order. In a specific case, multitasking and parallel processing may be advantageous. Furthermore, the separation of various system components in the aforementioned embodiments should not be construed as requesting such separation in all the embodiments. It should be understood that the aforementioned program components and systems may be integrated into a single software product or packaged into a multi-software product.

In accordance with the embodiments of the present invention, there is an advantage in that a recognition rate can be improved compared to an image processing-based technology.

Furthermore, there is an advantage in that the capacity of a network can be reduced because a capacity occupied by a convolutional neural network according to an embodiment of the present invention is reduced through weight quantization so that the network can be included in a terminal device although the terminal device has a restricted hard disk capacity. Accordingly, the present invention can be applied to a smart phone, etc.

Furthermore, there is an advantage in that a restriction to hardware performance of a terminal device can be avoided by obtaining an efficient image in a UX/UI manner if the terminal device executes the recognition system according to an embodiment of the present invention.

Furthermore, there are advantages in that a restriction to hardware performance of a terminal device can be avoided through image recognition for each step and a recognition effective speed can be enhanced because a recognition process is divided into the preview step and the activity (recognition result window) step in a UX/UI manner if the terminal device executes the recognition system according to an embodiment of the present invention.

Furthermore, in accordance with the system and method for recognizing the credit card number and expiration date of a credit card using a terminal device according to the embodiments of the present invention, an accuracy problem in the image recognition rate of a credit card can be solved.

Furthermore, if a terminal device executes the recognition system according to an embodiment of the present invention, in the activity step, all of card numbers and expiration date numbers are recognized again, and a user changes his or her credit card. Accordingly, the abuse of the present invention can be prevented.

As described above, the detailed terms proposed in this specification are not intended to limit the present invention. Accordingly, although the present invention has been described in detail with reference to the aforementioned embodiments, those skilled in the art to which the present invention pertains may reconstruct, change and modify the embodiments without departing from the scope of the present invention.

The scope of the present invention is defined by the appended claims rather than the detailed description, and the present invention should be construed as covering all modifications or variations derived from the meaning and scope of the appended claims and their equivalents.

What is claimed is:

1. A method for recognizing, by a terminal device using a convolutional neural network, a card number and expiration date of a card, the method comprising steps of:
    (a) obtaining an image of the card through a camera;
    (b) performing, using the convolutional neural network, position detection and number recognition on card numbers within the image obtained at the step (a),
    wherein the step (b) comprises:
        (1) detecting a position of a first number of the card numbers,
        (2) detecting positions of first three card numbers of the card numbers,
        (3) determining whether an image patch of the first three card numbers recognized at the step (2) corresponds to numbers,
        (4) comparing a recognition probability value with a predetermined threshold if, as a result of the determination at the step (3), it is determined that the image patch of the first three card numbers correspond to numbers, and recognizing the first three card numbers,
        (5) extracting information about a card type, a card number format, positions of expiration date numbers, and a format of the expiration date numbers from the first three card numbers recognized at the step (4), and
        (6) performing position detection and number recognition on remaining card numbers other than the first three card numbers using the information extracted at the step (5); and
    (c) performing, using the convolutional neural network, position detection and number recognition on the expiration date numbers within the image obtained at the step (a),
    wherein the card is a credit card.

2. The method of claim 1, further comprising a step of (d) performing position detection and number recognition on the expiration date numbers again using the image of the card, the positions of the expiration date numbers, and a format of the expiration date numbers obtained at the steps (a) to (c) in an activity step if the recognition of the expiration date numbers at the step (c) fails, after the step (c).

3. The method of claim 1, wherein the step (a) comprises:
    a step of obtaining, by the camera of the terminal device, an image frame of the card;
    a step of displaying a guide line on display means of the terminal device; and
    a preview step of obtaining an image frame of the card which overlaps the displayed guide line.

4. The method of claim 1, wherein the step (6) comprises steps of:
    detecting positions of the remaining card numbers using the information about the card type and card number format extracted at the step (5);
    determining whether an image patch of the remaining card numbers recognized at the step of detecting the remaining card numbers corresponds to numbers;
    comparing a recognition probability value with a predetermined threshold if, as a result of the determination, it is determined that the image patch of the remaining card numbers corresponds to numbers and recognizing the remaining card numbers other than the first three card numbers;
    determining a validity of all of the recognized first three card numbers and remaining card numbers using an Luhn algorithm; and
    extracting results of the recognition of the card numbers and information about positions of the respective numbers.

5. The method of claim 1, wherein the step (c) comprises steps of:
    detecting a position of a first number of the expiration date numbers using the information about the positions of the expiration date numbers and the format of the expiration date numbers extracted at the step (5);
    determining whether the first number of the expiration date numbers is 1 or 0 by recognizing the first number; and
    performing position detection and number recognition on remaining expiration date numbers other than the first number of the expiration date numbers.

6. The method of claim 5, wherein the step of performing position detection and number recognition on the remaining expiration date numbers other than the first number of the expiration date numbers comprises steps of:
    detecting the positions of the remaining expiration date numbers using the position of the first number of the expiration date numbers detected at the step of detecting the position of the first number of the expiration date numbers;

determining whether an image patch of the remaining expiration date numbers recognized at the step of detecting the remaining expiration date numbers corresponds to numbers;

comparing a recognition probability value with a predetermined threshold if, as a result of the determination, it is determined that the image patch of the remaining expiration date numbers corresponds to numbers and recognizing the remaining expiration date numbers other than the first number of the expiration date numbers; and determining whether a combination of the recognized first number of the expiration date numbers and the recognized remaining expiration date numbers corresponds to valid expiration date numbers.

7. The method of claim 1, further comprising a step of collecting, by the terminal device, training data of the convolutional neural network, wherein the step of collecting the training data comprises steps of:

(1) capturing, by the terminal device, images of different kinds of cards through a camera;

(2) extracting an image patch in which positions of numbers have been designated with respect to each of the images of the plurality of cards captured at the step (1) and performing image processing on the extracted image patches; and (3) collecting the extracted image patches on which image processing has been performed at the step (2).

8. A system for recognizing, by a terminal device using a convolutional neural network, a card number and expiration date of a card, the system comprising:

a camera configured to capture an image of the card; and a processor configured to:

(a) perform, using the convolutional neural network, position detection and number recognition on card numbers within the captured image by:

(1) detecting a position of a first number of the card numbers, (2) detecting positions of first three card numbers of the card numbers, (3) determining whether an image patch of the first three card numbers recognized at the step (2) corresponds to numbers, (4) comparing a recognition probability value with a predetermined threshold if, as a result of the determination at the step (3), it is determined that the image patch of the first three card numbers correspond to numbers, and recognizing the first three card numbers, (5) extracting information about a card type, a card number format, positions of expiration date numbers, and a format of the expiration date numbers from the first three card numbers recognized at the step (4), and (6) performing position detection and number recognition on remaining card numbers other than the first three card numbers using the information extracted at the step (5); and (b) perform, using the convolutional neural network, position detection and number recognition on the expiration date numbers within the captured image, wherein the card is a credit card.

* * * * *